US012764597B2

(12) United States Patent
Pfadler et al.

(10) Patent No.: US 12,764,597 B2
(45) Date of Patent: Oct. 13, 2026

(54) METHOD FOR DETERMINING A PREDICTIVE QUALITY OF SERVICE, pQoS, IN MOBILE COMMUNICATIONS

(71) Applicant: VOLKSWAGEN AKTIENGESELLSCHAFT, Wolfsburg (DE)

(72) Inventors: Andreas Pfadler, Berlin (DE); Luca Montero Bayo, Berlin (DE)

(73) Assignee: VOLKSWAGEN AKTIENGESELLSCHAFT (DE)

(*) Notice: Subject to any disclaimer, the term of this patent is extended or adjusted under 35 U.S.C. 154(b) by 277 days.

(21) Appl. No.: 18/679,685

(22) Filed: May 31, 2024

(65) Prior Publication Data

US 2024/0422614 A1 Dec. 19, 2024

(30) Foreign Application Priority Data

Jun. 13, 2023 (EP) .................................... 23179077

(51) Int. Cl.
*H04W 28/02* (2009.01)
*H04L 41/5009* (2022.01)
*H04W 24/10* (2009.01)

(52) U.S. Cl.
CPC ..... *H04W 28/0268* (2013.01); *H04L 41/5009* (2013.01); *H04W 24/10* (2013.01)

(58) Field of Classification Search
CPC .............. H04W 28/0268; H04W 24/10; H04L 41/5009
USPC .......................................................... 370/229
See application file for complete search history.

(56) References Cited

U.S. PATENT DOCUMENTS 10,009,189 B2 * 6/2018 Wu ..................... H04L 12/2809
10,432,422 B2 * 10/2019 Hyslop ................. H04L 12/403
10,686,725 B2 * 6/2020 Balmakhtar .......... H04L 41/342
11,129,002 B2 * 9/2021 Pfadler ................. H04L 1/0026
(Continued)

FOREIGN PATENT DOCUMENTS

WO 2021209801 A1 10/2021

OTHER PUBLICATIONS

3GPP; 3rd Generation Partnership Project; Technical Specification Group Services and System Aspects; Quality of Service (QoS) concept and architecture; TS 23-107; Release 17; Mar. 2022.

*Primary Examiner* — Melvin H Pollack
(74) *Attorney, Agent, or Firm* — BARNES & THORNBURG LLP

(57) ABSTRACT

A device and a method determine a predictive quality of service (pQoS) in mobile communication, wherein an indication of at least one data property concerning data to be exchanged between an application of a terminal and an external device is received from the application. A communication link is determined between the application and the external device. A pQoS model is determined based on the indicated data property and the communication link; a pQoS is determined by applying the PQoS model; and providing the determined pQoS to the application. Disclosed embodiments also include receiving from the application of the terminal an indication of at least one key performance indicator (KPI) that is applied by the application to measure an actual quality of service (QoS), and determining the pQoS model further based on the indicated at least one KPI.

24 Claims, 3 Drawing Sheets

(56) References Cited

U.S. PATENT DOCUMENTS

| | | | | |
|---|---|---|---|---|
| 11,641,598 | B2 * | 5/2023 | Cheng | H04W 28/24 370/329 |
| 12,045,738 | B2 * | 7/2024 | Sabella | H04W 24/04 |
| 12,108,286 | B2 * | 10/2024 | Perras | H04L 67/61 |
| 12,170,925 | B2 * | 12/2024 | Jeon | H04L 43/0852 |
| 12,407,434 | B2 * | 9/2025 | Svennebring | H04B 17/3913 |
| 12,425,298 | B2 * | 9/2025 | Mouradian | H04L 41/5067 |
| 12,446,100 | B2 * | 10/2025 | Freda | H04W 52/0229 |
| 12,452,146 | B2 * | 10/2025 | Kedalagudde | H04L 41/0894 |
| 12,457,156 | B2 * | 10/2025 | Malboubi | H04B 7/0632 |
| 12,490,291 | B2 * | 12/2025 | Rao | H04B 7/088 |
| 12,513,562 | B2 * | 12/2025 | Mansour | H04W 28/0268 |
| 12,526,201 | B2 * | 1/2026 | Alabbasi | H04L 41/147 |
| 12,549,461 | B2 * | 2/2026 | Wang | H04L 41/16 |
| 12,556,457 | B2 * | 2/2026 | Vasseur | H04L 41/147 |
| 12,556,937 | B2 * | 2/2026 | Ostrometzky | H04W 24/02 |
| 12,556,945 | B2 * | 2/2026 | Kovács | H04W 16/14 |
| 12,556,961 | B2 * | 2/2026 | Pateromichelakis | H04W 28/0263 |
| 12,574,303 | B2 * | 3/2026 | Ickin | H04L 41/16 |
| 12,574,313 | B2 * | 3/2026 | Vasseur | H04L 45/04 |
| 12,574,760 | B2 * | 3/2026 | O'Shea | H04B 17/336 |
| 12,574,792 | B2 * | 3/2026 | Erta | H04W 28/0268 |
| 12,580,825 | B2 * | 3/2026 | Keshavamurthy | H04L 41/16 |
| 12,581,354 | B2 * | 3/2026 | Römer | H04L 47/24 |
| 12,587,876 | B2 * | 3/2026 | Malboubi | H04W 24/02 |
| 12,593,259 | B2 * | 3/2026 | Conceicao | H04W 36/02 |
| 2019/0281476 | A1 | 9/2019 | Lyon et al. | |
| 2019/0281491 | A1 * | 9/2019 | Cheng | H04W 4/30 |
| 2020/0115047 | A1 | 4/2020 | Cao et al. | |
| 2022/0159075 | A1 | 5/2022 | Pfadler et al. | |
| 2023/0108302 | A1 | 4/2023 | Ramos Cantor et al. | |
| 2024/0381172 | A1 * | 11/2024 | Wette | H04W 28/0289 |
| 2025/0016168 | A1 * | 1/2025 | Kiehne | G06F 9/5011 |
| 2025/0300749 | A1 * | 9/2025 | Kim | H04W 24/10 |
| 2025/0300750 | A1 * | 9/2025 | Kim | H04B 17/373 |
| 2025/0300897 | A1 * | 9/2025 | Pateromichelakis | H04L 41/0833 |
| 2025/0374097 | A1 * | 12/2025 | Kim | G06N 3/045 |
| 2026/0030546 | A1 * | 1/2026 | Bega | G06N 3/092 |
| 2026/0039560 | A1 * | 2/2026 | Pateromichelakis | H04L 41/14 |

* cited by examiner

METHOD FOR DETERMINING A PREDICTIVE QUALITY OF SERVICE, pQoS, IN MOBILE COMMUNICATIONS

PRIORITY CLAIM

This patent application claims priority to European Patent Application No. 23179077.5, filed 13 Jun. 2023, the disclosure of which is incorporated herein by reference in its entirety.

SUMMARY

Illustrative embodiments relate to a method for determining predictive quality of service, pQoS, in mobile communication.

BRIEF DESCRIPTION OF THE DRAWINGS

Disclosed embodiments will be described in more detail below with reference to the drawings, in which.

DETAILED DESCRIPTION

Figure 1:
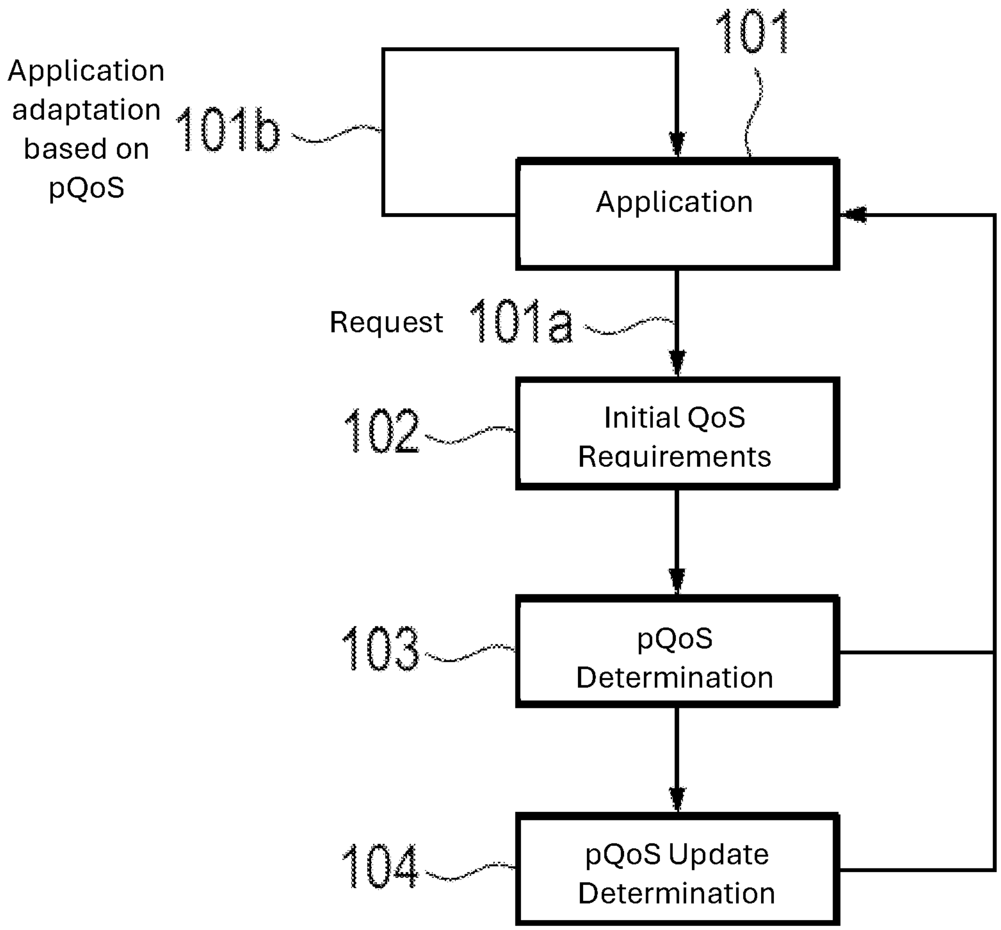
FIG. 1 illustrates am exemplary embodiment of an application requesting a pQoS.

Prior art defines an automated vehicle, also known as an AV, an autonomous vehicle, a self-driving car, a driverless car, a robo-car, or a robotic car, which is a vehicle that is capable of sensing its environment and moving safely with little or no human input.

Further, automotive applications and mobile communications become more and more entangled, particularly due to the increasing interest in automatic driving that requires larger amounts of data when compared to conventional driving. These data amounts are provided partially by the transportation vehicle itself (i.e., by sensors thereof) and partially via an air interface. Via the air interface such as a vehicle to vehicle, V2V, communication or a vehicle to infrastructure, V2I, communication or a vehicle to everything, V2X, communication is carried out, the latter including communication with road side units, RSUs.

In such systems mobile communication is essential, which depending on a criticality of the operation must also meet certain requirements of quality of service, QoS.

In this context, a 5G communication system can support demanding QoS requirements of many advanced V2X use cases and their applications. However, efficient driving, especially of automated transportation vehicles, may be affected by sudden changes of the provided QoS. For that reason, a prediction of QoS changes and early notification of these predicted changes to transportation vehicles recently have been enabled, for example, by 5G communication systems. This approach enables transportation vehicles to avoid or mitigate effects of sudden QoS changes at application level.

A predicted QoS, pQoS, may be used to plan execution of a route or on a lower level to plan a specific maneuver. If the pQoS does not meet the requirements long enough, an application will not perform a given action. Typically, applications adapt to a pQoS timeseries, so that an improved or even optimal target distance planning can be achieved to get the most out of the predicted QoS.

However, distinct pQoS models and learning methods may be applied to predict future QoS for users such as AVs. As a result the pQoS profile provided to the user or receiver may vary between different MNOs.

5G communication systems provide notifications of pQoS changes upon request from a V2X application server, AS. The V2X AS can either subscribe to notifications or request a single notification from the network. The AS provides information to the network about: Location, Time window to which the notification of the potential QoS change applies, Threshold(s), indicating level(s) which, if crossed, trigger the notification that the potential QoS change can happen.

So far, the QoS prediction function is obtained from a trained model which is trained by either some training data or on real data transfer. Usually the network provider does not know the exact properties behind the data traffic when real data is transferred. In addition, they do not know what kind of traffic the user requests the pQoS profile for.

The pQoS profile commonly consist of distinct features which are predicted, such as latency and data rate but it already foreseen that different applications have distinct application specific key performance indicators (KPIs) which are sometimes even on application layer and also not known and accessible for the network provider.

The pQoS model is obtained by different kind of data traffic with distinct properties. The different data traffic however has an impact on the pQoS model which is obtained, i.e., it gets biased depending on the data traffic properties. By generating the pQoS model from different kind of traffic types one gets an averaged prediction model which is not necessary accurate when the traffic properties are changing. In addition to the data traffic property dependent feature (KPIs) learning is foreseen and this even on application layer (not known to the network). How can pQoS prediction accuracy be improved is a significant issue particularly taking into account a vast variety of different data traffic properties and distinct application-dependent KPIs.

Prior art indicates a publication of US 2023/0108302 A1 concerning reporting by an application current and future position and trajectories of multiple devices as well as at least one of: a number, a size and a periodicity of application messages sent via radio resources to obtain a predicted QoS from a network.

Disclosed embodiments overcome or reduce at least some of the drawbacks of the prior art and to provide a method for determining a predictive quality of service, pQoS, in mobile communication. Particularly, an aim of the present disclosure is to improve the QoS prediction accuracy.

A first disclosed embodiment refers to a method for determining a predictive quality of service, pQoS, in mobile communication, the method comprising: receiving from an application an indication of at least one data property concerning data to be exchanged between the application and an external device, determining a communication link between the application and the external device; determining a pQoS model depending on the indicated data property and the communication link, determining a pQoS by applying the PQoS model and providing the determined pQoS to the application. Therefore, according to the method, data type/property received from an application is an indicator of how to determine a pQoS and the pQoS depends on the data type/property. Consequently, when all other pQoS considerations are the same and the data type/property changes, the pQoS model and the output pQoS may change as well because different data types may have different transmission requirements and may thus result in different pQoS reports/predictions. As a result, the pQoS may be determined more precisely.

In the context of the claim the application is executed by a terminal requesting the pQoS indication.

The method further comprises: receiving from the application an indication of at least one key performance indicator, KPI, that is applied by the application to measure an actual QoS, determining the pQoS model further depending on the indicated at least one KPI.

As a result, in addition to the data traffic property dependency, KPIs utilization (as well as learning) may be present to further improve determination of pQoS. That is, a knowledge of how the application evaluates performance (e.g., KPI for QoS, QoE) is beneficial to more precisely determine a pQoS. In an exemplary embodiment the KPIs are evaluated on an application layer (i.e., by default not known to the network (lower layers)).

In a certain case it may be that the pQoS determining module (or otherwise unit) uses different metrics to predict pQoS than the application uses to evaluate the actual QoS. In such cases the pQoS determination may not be well suited to the application requesting the pQoS. When the pQoS determining module is aware of the data type and the application's KPIs for QoS, the pQoS may be determined more precisely since the expectations of the application are defined more accurately. For example, one application may be more concerned with a signal to noise ratio while another application may be concerned with latency. Other KPIs may include one or more of the following: Data loss, Bandwidth, Error rate.

Optionally, according to any embodiment defined above, the data property indicates a feature of a corresponding communication protocol configuration.

In some cases the data property may generally define what is a content of the exchanged traffic between the application and the external device. On one level of consideration, the data property concerns a communication protocol. Different network protocols may have different requirements regarding QoS and regarding the amount of transmission overhead added to the data payload by headers, encoding, encryption, error correction or other similar mechanisms of data transmission. Consequently, it may happen that although the same amount of data will be transmitted in total by different transmission protocols, the amount of received data payloads may significantly differ between the distinct transmission protocols. Other features of communication protocols may concern one or more of the following: Message size, Protocol type, Employed reliability measures (such as FEC), Communication type/band.

As a positive result, indication of the corresponding communication protocol configuration also aims at improving pQoS determination thereon.

Optionally, according to any embodiment defined above, the data property indicates a data encoding type and/or a data encryption type.

Similar to the example above the application may directly indicate data encoding and/or data encryption type. Encoding may be or may comprise data compression. For example, when basic encoding and/or encryption types are applied, less data may be exchanged in a time unit as opposed to sophisticated encoding and/or encryption types. By knowing this parameter, the pQoS determination may also be improved. As an example, for determining a pQoS for a communication encoded by method X and encrypted by method Y a particular pQoS model M1 may be applied.

It is beneficial to consider such embodiments when determining pQoS because some encoding or encryption types may be less data efficient than other and/or be less resilient to data errors than other. Also, application of different error correction methods may impact QoS.

Optionally, according to any embodiment defined above, the data property indicates a data communication pattern.

Such a pattern may refer to a pattern such as on or more of the following: bursty (abrupt, high intensity, relatively-short transmissions), greedy (requiring lot of bandwidth BW for considerable periods of time), smooth (data flows at even rate, doesn't burst), benign (not greedy for lots of BW).

Other data communication patterns may be one of the following: non-scheduled event(s), scheduled periodic events, semi-persistent events, persistent events/communication. Such a pattern may influence a decision on how to determine (pQoS model) and how to provide (pQoS report content/format or the like) a pQoS indication for an application. It is beneficial to consider such embodiments when determining pQoS because data communication pattern may influence accuracy of determination of pQoS.

Optionally, according to any embodiment defined above, the method further comprises storing the pQoS model corresponding to the indicated application and the indicated at least one data property.

In general, data properties may be one or more of the following:

- message size;
- data content, e.g., audio and/or video streaming;
- application (purpose), e.g., remote guidance;
- correlation to another stream, e.g., UL and DL are dependent;
- network protocol, e.g., UDP/TCP;
- pattern signal, e.g., frame rate;
- communication scenario;
- communication pattern: periodic, event based, temporal;
- criticality: operational safety, personal safety;
- destination and payload origin (e.g., from a transportation vehicle's ECU to a backend).

The pQoS model may be stored locally for future use or stored on a remote device to save local memory resources.

Optionally, according to any embodiment defined above, each KPI is indicated with a correspondence between one or more KPI values and a QoS level on application layer.

For the application to more precisely formulate a KPI, the application may indicate which values/ranges or the like correspond to given QoS. Such indication may be made by providing a suitable correspondence table. By precisely knowing how a KPI is mapped by the application to QoS, the pQoS determining module may predict QoS with greater accuracy since the application may also indicate its requested QoS. Accordingly, the indication of such a correspondence also improves accuracy of pQoS indications.

Optionally, according to any embodiment defined above, the method further comprises receiving feedback to the pQoS and adapting the pQoS model according to the received feedback.

In a static environment the operation of a pQoS model and consequently the pQoS determining process may be predefined. However, it may also adapt to current states of the system and/or the receiver/terminal (application). The adaptation may be based on feedback on a difference between the pQoS and the actually experienced QoS by a given receiver/terminal/application.

For example, a given range of SNR is reported as a pQoS. However, after an application provides feedback that actually the throughput experienced was not matching the pQoS SNR, the pQoS determining module may adapt its mapping so that the given range of SNR reported as the pQoS is thereafter translated to a different pQoS in view of the reported data property of the application and optionally one or more KPIs of the application. Consequently, the pQoS determination process may be further improved by such an adaptive approach.

Optionally, according to any embodiment defined above, the pQoS profile is further determined according to one or more requirements of the application.

Such requirements may be one or more of: profile length (denoting a prediction time horizon e.g., in seconds, in other words this information indicates for how long the prediction applies into the future), confidence, duration. Having accurate pQoS indications allows a positive effect to efficiently configure an application of a receiver/terminal thereby often reducing a number of adaptations of the application operation due to a mismatch between a pQoS and actual QoS.

Optionally, according to any embodiment defined above, the pQoS profile is further determined according to environmental features corresponding to the user terminal executing the application.

The environmental (or otherwise situational) features may be one or more of: time of day, day, weather, traffic, ego information, such as, position, speed, past and future path or the like. Such indications of parameters may further help to configure a pQoS model, which may adapt the output pQoS accordingly as environmental parameters often affect radio communication.

Optionally, according to any embodiment defined above, the determining a pQoS model comprises: determining that a previously defined pQoS model is undefined for the indicated at least one data property, creating a new pQoS model for the indicated at least one data property based on at least one previous pQoS.

Another benefit of the disclosed embodiments is that it may adapt to previously unknown data properties and/or KPIs of applications. When an unknown data property is reported by an application the pQoS determining model may apply a pQoS model that is determined to be the closest one to the reported new data parameter or apply a mixed approach determined by more than one pQoS model, outputs of which may then be averaged or weighted according to preferred ratios.

Optionally, according to any embodiment defined above, the pQoS is determined per application.

For the pQoS to be most tailored, it is determined per application in a more generic case the pQoS may be determined for a device/terminal.

A second disclosed embodiment is a device comprising a processor adapted to perform the method of the first embodiment of the present disclosure according to any options presented above.

The device may be a backend device or a device of a mobile network operator's, MNO's, network infrastructure device. Such MNOs devices/functions may be one or more of: a Mobility Management Entity, MME; a Serving Gateway, SGW; a Packet Data Network Gateway, PDN GW; an Access and Mobility Management Function, AMF; a Session Management Function, SMF; a Policy Control Function, PCF; a Network Exposure Function, NEF; or similar.

A third disclosed embodiment is a computer program comprising instructions which, when the program is executed by a computer, cause the computer to carry out the method of the first embodiment of the present disclosure according to any options presented above.

A fourth disclosed embodiment is a computer-readable storage medium comprising instructions which, when executed by a computer, cause the computer to carry out the method of the first embodiment of the present disclosure according to any options presented above.

Such computer programs are typically executed by utilizing the computing resources in a computing device e.g., a processor or a controller. Applications are stored on a non-transitory medium. An example of a non-transitory medium is a non-volatile memory, for example, a flash memory while an example of a volatile memory is RAM. The computer instructions are typically executed by a processor. These memories are exemplary recording media for storing computer programs comprising computer-executable instructions performing all the operations of the computer-implemented method according the technical concept presented herein.

The different embodiments described herein may be combined unless the contrary is indicated herein.

Some portions of the detailed description which follows are presented in terms of data processing procedures or other symbolic representations of operations on data bits that can be performed on computer memory. Therefore, a computer executes such logical operations thus requiring physical manipulations of physical quantities.

Usually these quantities are electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

As utilized herein, the term "example" means serving as a non-limiting example, instance, or illustration. As utilized herein, the terms "for example" and "e.g." introduce a list of one or more non-limiting examples, instances, or illustrations.

As used herein, the term "and/or" includes any and all combinations of one or more of the associated listed items. Further, the use of "may" when describing exemplary embodiments refers to "one or more embodiments." Further, in the following description of exemplary embodiments, the terms of a singular form may include plural forms unless the presented context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items and expressions such as "at least one of" when preceding a list of elements, modify the entire list of elements.

Reference will now be made in detail to exemplary embodiments which are illustrated in the drawings. Effects and features of the exemplary embodiments will be described with reference to the accompanying drawings. Therein, like reference numerals denote like elements, and redundant descriptions are omitted. The present disclosure, however, may be embodied in various different forms, and should not be construed as being limited to only the illustrated embodiments herein. Rather, these disclosed embodiments are provided solely as examples for fully conveying the features of the present disclosure to those skilled in the art.

FIG. 1 illustrates a high-level example of an application requesting a pQoS.

At operation at 101 an application makes a request 101*a* for a pQoS. This request is transmitted with initial QoS requirements of the application and a specification of a data property according to the first disclosed embodiment. This request may be server by a local pQoS determining module or transmitted to an external pQoS entity (which is a typical case). The pQoS determining module, generates a pQoS in view of the data property at operation at 103. Once ready, the pQoS is reported to the application. Optionally, the pQoS determination module may at operation at 104 create a standing request for pQoS updates for the request of the application. This allows to monitor pQoS changes for the request while taking into account other considerations such as environmental and/or situational parameters described above. Once an updated pQoS meets trigger conditions (e.g., decrease of the pQoS by a threshold) the updated pQoS is notified to the application, which in turn may on that basis adapt 101*b* its application.

Also, as explained above, the application needs to indicate in the send message/request the used one or more data traffic properties and may also indicate one or more aimed KPIs, which enables the pQoS determining module to feed a correct pQoS model for determining the pQoS and learning of the pQoS in case of an adaptable pQoS model.

Figure 2:
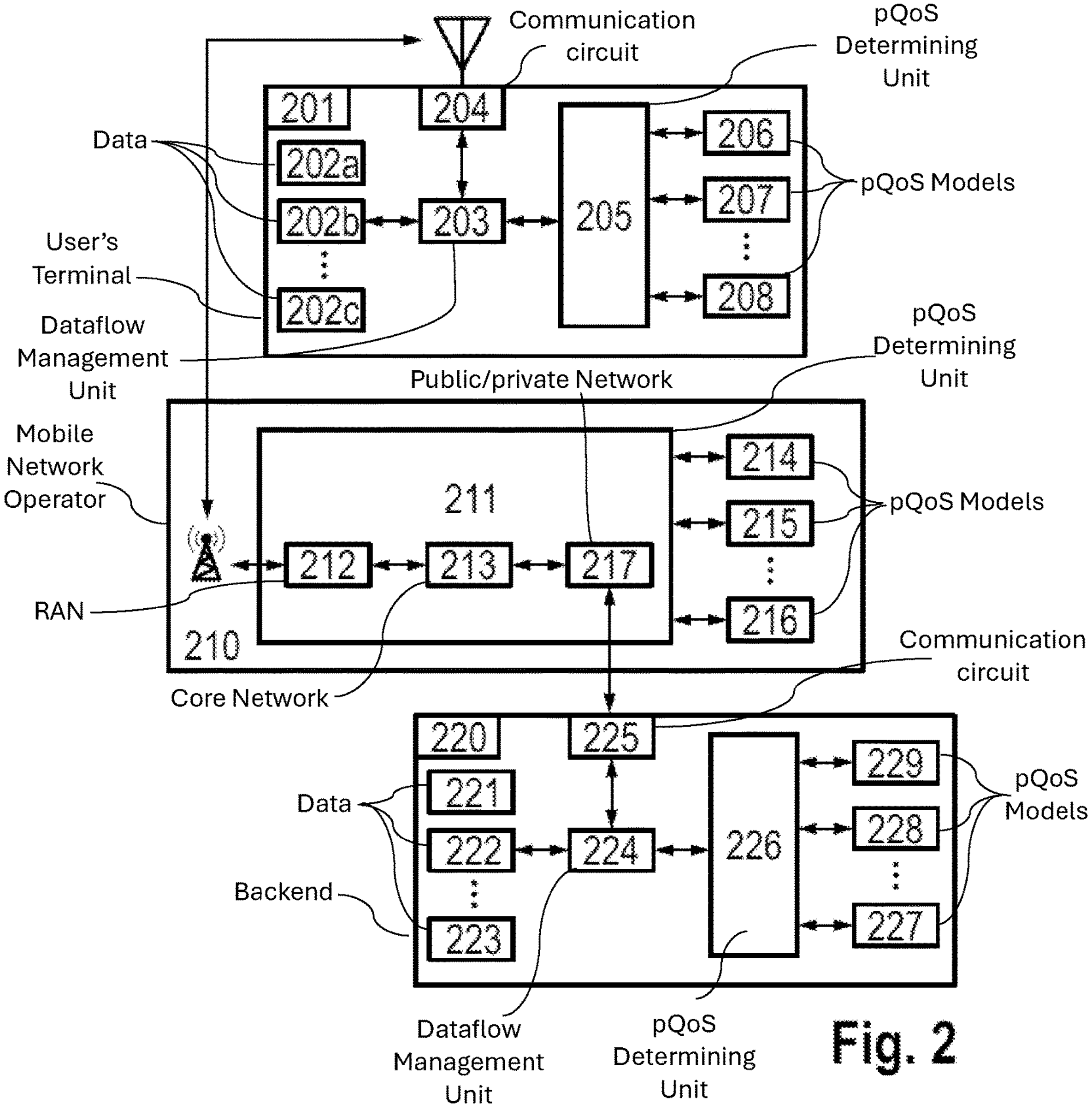
FIG. 2 illustrates an exemplary embodiment of a disclosed system.

FIG. 2 illustrates an example of a disclosed system. This figure illustrates how distinct pQoS model(s) for different data traffic properties are learned. Data traffic properties need to be indicated and are known by the application (data source/sink). FIG. 2 depicts an exemplary architecture of the present pQoS taking into account different traffic properties and generating/applying for/to each of them distinct pQoS models. The position of the pQoS client and pQoS server can be implemented in various ways, for example: (1) a pQoS client can be located at user and backend side and the server on the network side, e.g., hosted by an MNO; (2) a pQoS client can be located on the user's side and the server on the backend side.

There are three main components of the system that are a user, which is a user's terminal/receiver 201, one or more servers/systems of different MNOs 210, a backend 220.

The user's terminal 201 executes one or more data transmissions/receptions 202*a* to 202*c* (such as data for a tele-operated driving application) under supervision of a dataflow management unit 203 coordinating any data transfer with a communication unit 204 of the user's terminal.

A pQoS determining module 205 (particularly a pQoS client/server) may also be present optionally in the user's terminal 201. This module determines pQoS indications for different applications as described above. This module 305 typically receives input from QoS dependent applications.

pQoS determining module 205 may also have access to one or more pQoS models 206 to 208 wherein the pQoS models correspond to different data properties. As explained above the pQoS models may further correspond to different applications' KPIs.

The second component of the system is one or more servers/systems of different MNOs 210. User terminals 201 exchange data with the one or more servers/systems of different MNOs 210. Each MNO typically operates a radio communication network 212 and a core network 213. In some instances an MNO may communicate over a public or private network with a backend 220 responsible for managing user terminals 201 using the available MNOs at given time instances. The backend 220 may be an automated driving control centre.

Each MNO may optionally comprise the pQoS determining module 217. The pQoS determining module 217 may be implemented at an MNO's side, that may be understood as an implementation by one or more of the following: a base station, a radio access network, a core network, the Internet global network. The examples indicated above may also be combined in a system.

Specifically, the core network may also comprise different devices, which may comprise the cross-MNO pQoS module/API. Such devices/functions of the core network may be one or more of: a Mobility Management Entity, MME; a Serving Gateway, SGW; a Packet Data Network Gateway, PDN GW; an Access and Mobility Management Function, AMF; a Session Management Function, SMF; a Policy Control Function, PCF; a Network Exposure Function, NEF; or similar.

Corresponding to 206 to 208 the pQoS determining module 217 may also have access to one or more pQoS models 214 to 216 wherein the pQoS models correspond to different data properties. As explained above the pQoS models may further correspond to different applications' KPIs.

The last component of the system is the backend 220. Typically, the backend 220 comprises counterparts of the components present in a user's terminal 201.

The backend 220 executes one or more applications (such as a tele-operated driving application), which exchange data 221 to 223 with remote application(s) under supervision of a dataflow management unit 224 coordinating data transfers for the applications with a communication unit 225 of the backend 220.

The backend 220 may optionally comprise the pQoS determining module 226.

Corresponding to 206 to 208 the pQoS determining module 226 may also have access to one or more pQoS models 227 to 229 wherein the pQoS models correspond to different data properties. As explained above the pQoS models may further correspond to different applications' KPIs.

Figure 3:
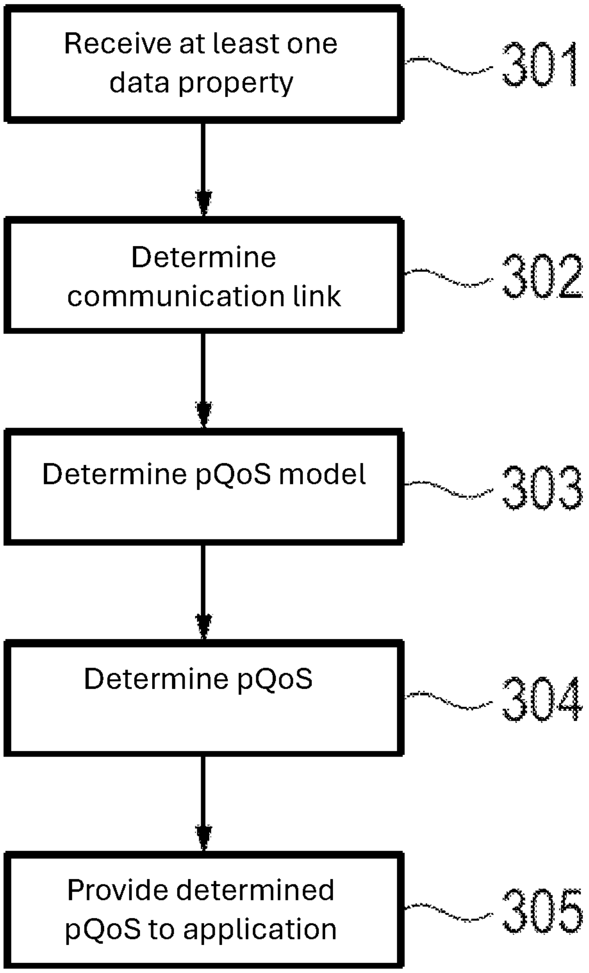
FIG. 3 illustrates an exemplary block diagram of the disclosed method.

FIG. 3 illustrates another exemplary block diagram of the method according to the present disclosure.

The first operation of the method is to receive 301 from an application an indication of at least one data property concerning data to be exchanged between the application and an external device. Next the method executed determining 302 a communication link between the application and the external device and determining 303 a pQoS model depending on the indicated data property and the communication link. Thereafter, the method performs an operation of determining 304 a pQoS by applying the PQoS model and provides 305 the determined pQoS to the application.

REFERENCE SIGNS

101 Application
101*a* Request

101*b* Application adaptation based on pQoS
102 Initial QoS requirements for a data property
103 pQoS determination
104 pQoS update determination
201 user's terminal
202*a* Data 1
202*b* Data 2
202*c* Data X
203 Dataflow management unit
204 Communication circuit
205 pQoS determining unit (pQoS client/server)
206 pQoS model for data traffic property (set) 1
207 pQoS model for data traffic property (set) 2
208 pQoS model for data traffic property (set) X
210 mobile network operator, MNO
211 pQoS determining unit (pQoS client/server)
212 Radio Access Network, RAN, of the MNO
213 Core network of the MNO
214 pQoS model for data traffic property (set) 1
215 pQoS model for data traffic property (set) 2
216 pQoS model for data traffic property (set) X
217 Public/private network
220 Backend
221 Data 1
222 Data 2
223 Data X
224 Dataflow management unit
225 Communication circuit
226 pQoS determining unit (pQoS client/server)
227 pQoS model for data traffic property (set) 1
228 pQoS model for data traffic property (set) 2
229 pQoS model for data traffic property (set) X
301 Receive from an application an indication of at least one data property
302 Determine a communication link of the application
303 Determine a pQoS model depending on the indicated data property and the communication link
304 Determine a pQoS by applying the PQoS model
305 Provide the determined pQoS to the application

The invention claimed is:

1. A device for determining a predictive quality of service (pQoS) for mobile communication with a terminal associated with a user, the device comprising:

a processor configured to:

receive, from an application of the user's terminal, an indication of at least one data property concerning data to be exchanged between the application of the user's terminal and an external device;

determine a communication link between the application and the external device;

select a pQoS model from among a plurality of pQoS models for use in determining a pQoS based on the indicated at least one data property and the communication link;

determine a pQoS by applying the selected PQoS model;

provide the determined pQoS to the application of the user's terminal;

receive, from the application of the user's terminal, an indication of at least one application-dependent key performance indicator (KPI) that is applied by the application to measure an actual quality of service (QoS); and based on the indicated at least one application-dependent KPL determine whether to adapt the selected pQoS model or select another pQoS model from among the plurality of pQoS models for use in future determinations of the pQoS for transmission to the application.

2. The device of claim 1, wherein the indicated at least one data property indicates a feature of a corresponding communication protocol configuration.

3. The device of claim 1, wherein the indicated at least one data property indicates a data encoding class and/or a data encryption class.

4. The device of claim 1, wherein the indicated at least one data property indicates a data communication pattern.

5. The device of claim 1, wherein the processor is further configured to store the pQoS model corresponding to the indicated application and the indicated at least one data property.

6. The device of claim 1, wherein each indicated at least one application-dependent KPI is indicated with a correspondence between one or more application-dependent KPI values and a QoS level on an application layer.

7. The device of claim 1, wherein the processor is further configured to receive feedback regarding the pQoS from the application of the user's terminal and adapt the pQoS model in response to and according to the received feedback.

8. The device of claim 1, wherein a pQoS profile that includes distinct features that are predicted according to one or more requirements of the application of the user's terminal.

9. The device of claim 8 wherein the pQoS profile is further determined according to environmental features corresponding to the user terminal executing the application.

10. The device of claim 1, wherein the determination of whether to adapt the selected pQoS model or select another pQoS model from among the plurality of pQoS models for use in future determinations of the pQoS for transmission to the application the includes:

determination of whether a previously defined pQoS model is undefined for the indicated at least one data property; and creation of a new pQoS model for the indicated at least one data property based on at least one previous pQoS.

11. The device of claim 1, wherein the determination of the pQoS is determined per application of the user's terminal.

12. The device of claim 1, wherein the device is a backend device.

13. The device of claim 1, wherein the device is a device of a mobile network operator's (MNO's) network infrastructure device.

14. A method for determining a predictive quality of service (pQoS) for mobile communication, the method comprising:

receiving from an application of the user's terminal an indication of at least one data property concerning data to be exchanged between the application of the user's terminal and an external device;

determining a communication link between the application and the external device;

selecting a pQoS model from among a plurality of pQoS models for use in determining a pQoS based on the indicated at least one data property and the communication link;

determining a pQoS by applying the PQoS model; providing the determined pQoS to the application of the user's terminal;

receiving from the application of the user's terminal an indication of at least one application-dependent key performance indicator (KPI) that is applied by the application to measure an actual quality of service (QoS); and based on the indicated at least one application-dependent KPI, determining the pQoS model whether to adapt the selected pQoS model or select another pQoS model from among the plurality of pQoS models for use in future determinations of the pQoS for transmission to the application.

15. The method of claim 14, wherein the indicated at least one data property indicates a feature of a corresponding communication protocol configuration.

16. The method of claim 14, wherein the indicated at least one data property indicates a data encoding class and/or a data encryption class.

17. The method of claim 14, wherein the indicated at least one data property indicates a data communication pattern.

18. The method of claim 14, further comprising storing the pQoS model corresponding to the indicated application and the indicated at least one data property.

19. The method of claim 14, wherein each indicated at least one application-dependent KPI is indicated with a correspondence between one or more application-dependent KPI values and a QoS level on an application layer.

20. The method of claim 14, further comprising receiving feedback regarding the pQoS from the application of the user's terminal and adapting the pQoS model in response to and according to the received feedback.

21. The method of claim 14, wherein a pQoS profile that includes distinct features that are predicted according to one or more requirements of the application of the user's terminal.

22. The method of claim 21 wherein the pQoS profile is further determined according to environmental features corresponding to the user terminal executing the application.

23. The method of claim 14, wherein the determining whether to adapt the selected pQoS model or select another pQoS model from among the plurality of pQoS models for use in future determinations of the pQoS for transmission to the application:

determining whether a previously defined pQoS model is undefined for the indicated at least one data property; and creating a new pQoS model for the indicated at least one data property based on at least one previous pQoS.

24. The method of claim 14, wherein the determination of the pQoS is determined per application of the user's terminal.

* * * * *